June 25, 1957  P. E. PRUTZMAN  2,797,287
REARVIEW TRUCK MIRRORS
Filed Aug. 4, 1955  4 Sheets-Sheet 2

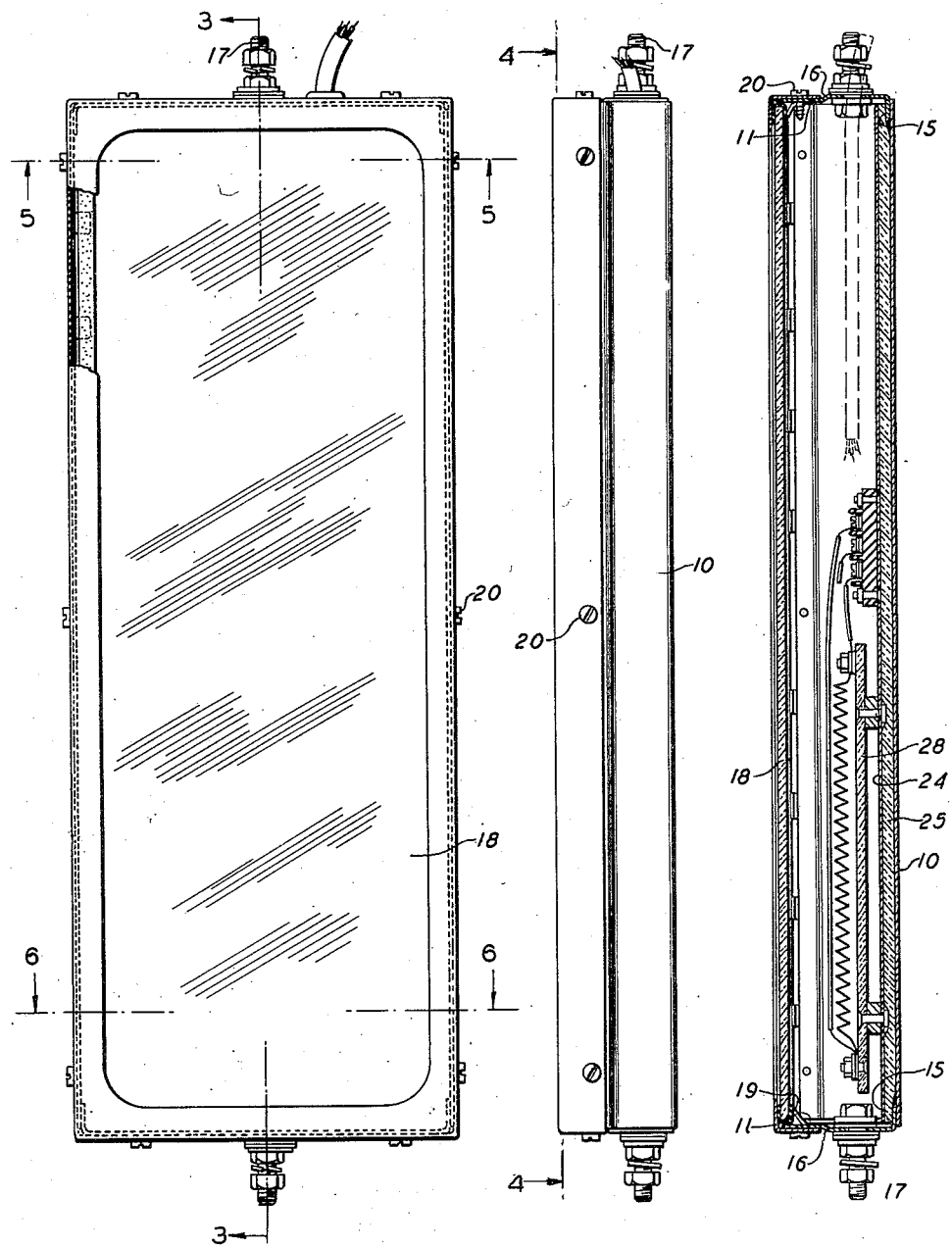

PAUL E. PRUTZMAN
INVENTOR

ATTORNEY

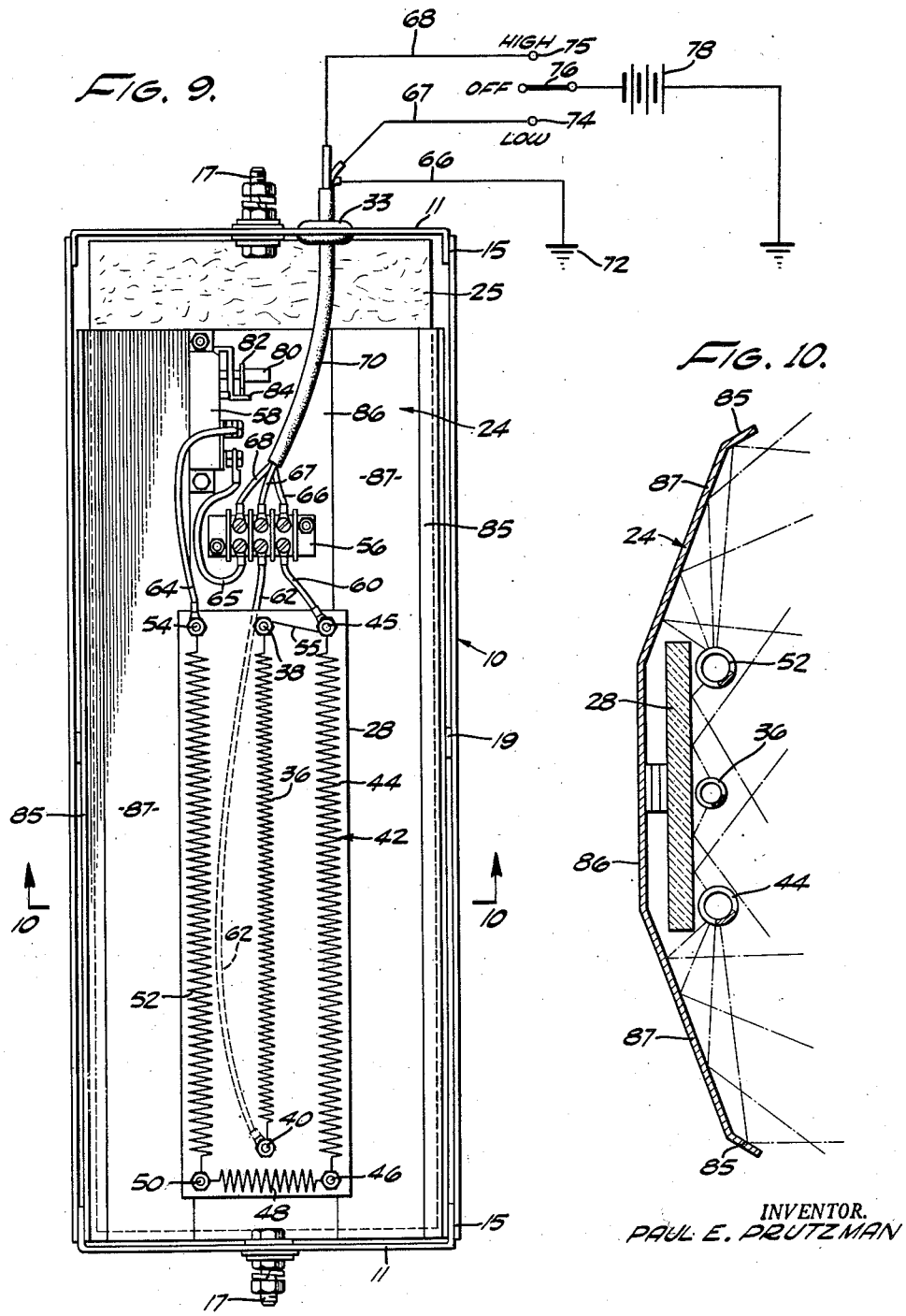

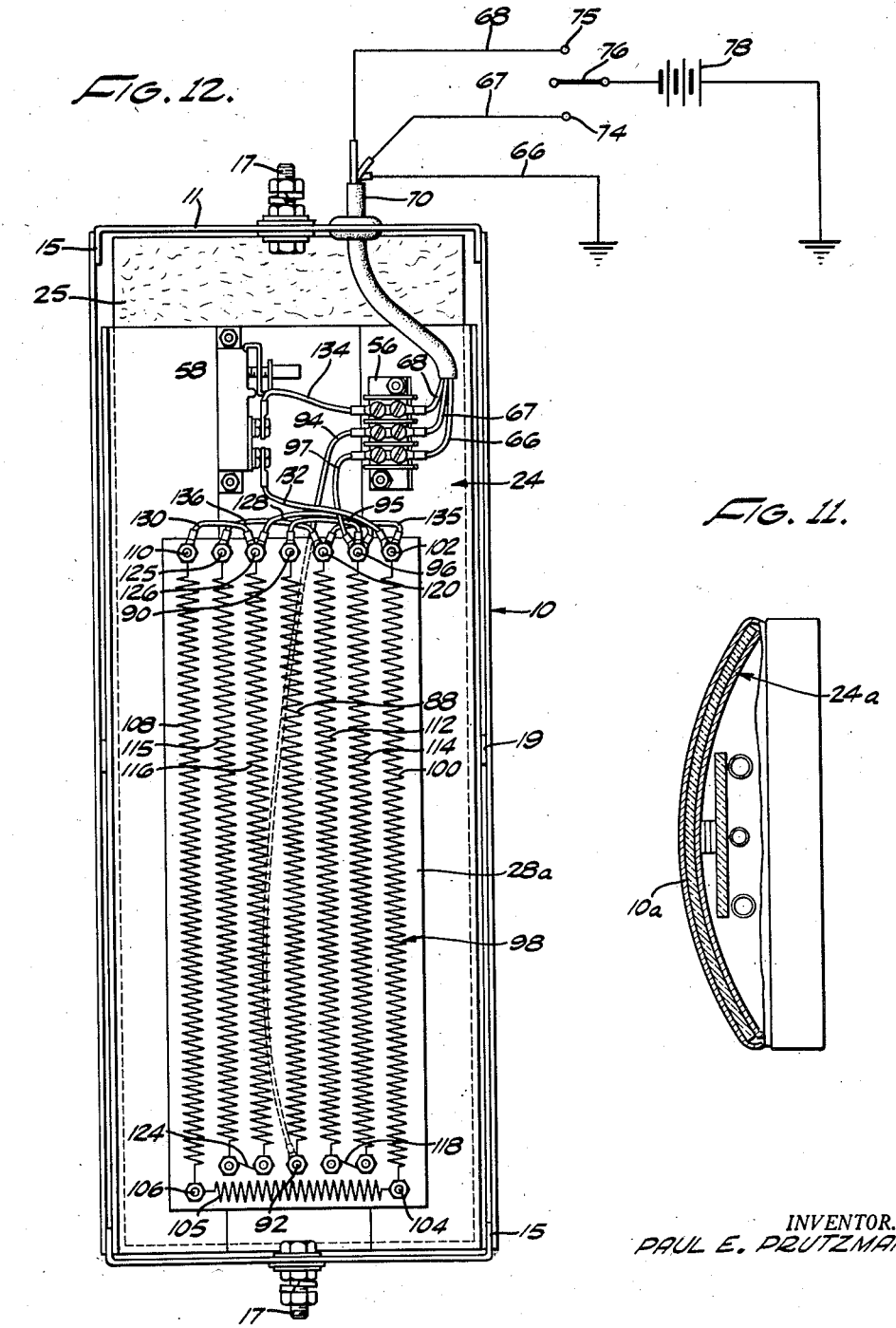

United States Patent Office 2,797,287
Patented June 25, 1957

2,797,287

REAR VIEW TRUCK MIRRORS

Paul E. Prutzman, South Gate, Calif.

Application August 4, 1955, Serial No. 526,400

17 Claims. (Cl. 219—19)

This invention relates to rear view mirrors for automotive vehicles, particularly trucks, and is directed to a mirror construction incorporating heating means to keep the reflecting surface of the mirror clear in unfavorable weather.

This application is a continuation-in-part of my copending application S. N. 322,966 filed November 28, 1952, entitled "Rear View Truck Mirror," now abandoned, which application is a division of my application bearing the same title, filed January 12, 1952, S. N. 266,231, now Patent No. 2,722,160.

The invention is directed to certain problems that are involved in heating a rear view mirror efficiently under the varied conditions of truck operation. These problems are especially troublesome in regions where the temperature ranges from summer heat to below zero.

One of the problems is to provide a heating arrangement for energization by the electrical system of a truck, which heating arrangement will serve its purpose effectively at relatively low wattage output. The invention meets this problem, in part, by placing the heating means inside a closed upright housing or casing with the mirror arranged as the rear wall thereof. A further part of the solution is the provision of an insulated reflector inside the casing to reflect heat from the heating means to the mirror, as will be explained.

A second problem is to approach uniformity of heat distribution over the area of the mirror to a required degree. It has been found in practice that when enough heat is generated to serve the purpose of the invention under adverse weather conditions, it is difficult to keep from underheating the bottom end of the mirror and at the same time to keep from overheating the top end of the mirror. In fact, great care is required to avoid such a wide temperature differential as to cause the mirror to break. A feature of the invention in this regard is the concept of heating the bottom portion of the mirror by direct radiation and the top portion of the mirror primarily by convection inside the casing. Fortuitously such an arrangement also reduces the amount of electrical energy required to heat the mirror.

Another problem is to provide a heating arrangement that will supply enough heat to meet the conditions imposed by the relatively cold weather without overheating the mirror when the weather is only moderately cold. This problem is met, in part, by a construction that is inherently effective over a wide range of temperatures with a given heat output and is met in further part by providing for the selective use of two different levels of heat output. The operator of the truck has the choice between a low heat output for moderately cold weather and a high heat output for cold starts and for severe weather conditions.

A special feature of the preferred practice of the invention is the provision for automatic thermostatic control for the high rate of heat output. This feature makes possible a mirror construction with an exceptionally high maximum heat output as required for arctic regions, especially in military service.

A further problem is to provide a heated rear view mirror that may be serviced and repaired in a rapid and convenient manner without requiring special tools or specialized skills. To meet this problem, the casing for the mirror is made in two separable parts and the electrical heating means inside the casing comprises an assembly of easily removable parts. In the preferred practice of the invention, for example, the assembly comprises an insulating panel with heating elements mounted thereon, a separate thermostat, and a separate terminal block by means of which a cable from the cab of the truck is releasably connected to the heating element and to the thermostat.

The various features and advantages of the invention may be understood from the following description taken with the accompanying drawings.

In the drawings, which are to be regarded as merely illustrative:

Fig. 1 is an elevation of the rear reflecting or mirror side of one embodiment of the invention;

Fig. 2 is a side elevation of the same embodiment;

Fig. 3 is a longitudinal central section taken as indicated by the line 3—3 of Fig. 1;

Fig. 9 is an interior elevational view similar to Fig. 4 illustrating a second embodiment of the invention;

Fig. 10 is an enlarged transverse cross-section taken as indicated by the line 10—10 of Fig. 9;

Fig. 11 is a transverse cross-sectional view showing how the device of Fig. 9 may be housed in a casing of a different cross-sectional configuration; and Fig. 12 is an interior elevational view similar to Fig. 9 illustrating a third embodiment of the invention having special utility for military service in arctic regions.

In the first embodiment of the invention, the housing or casing includes a trough-shaped longitudinal member 10 and two end plates 11. These parts may be stamped or pressed from thin sheet metal, for example, cold rolled steel. The trough-shaped member 10 is the front side of the installed device and may be said to provide a rearwardly swept front wall in the sense that the two side portions of the front wall are inclined towards the rear. In this instance, the cross-sectional configuration of the trough-shaped member 10 is that of a half of an elongated octagon, this form being stiffer than an arcuate section of the same material.

Figure 7:
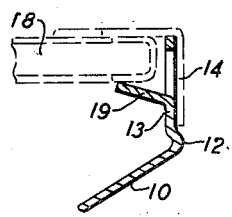
Fig. 7 is a detail showing the relation of the mirror to the mirror-supporting means, the detail being a section taken on the line 7—7 of Fig. 4.

As best shown in Fig. 7, an outwardly projecting rib 12 is formed by crimping the metal at the point of intersection of the side and bottom of trough member 10. This rib should have a height at least equal to and preferably slightly greater than the thickness of the side wall of the mirror-retaining rim 14. This rib has been found to add materially to the stiffness of the casing, permitting thinner metal to be used than would be suitable without it; but its most important advantage is in excluding water from the joint between the side wall 13 of the case and the side wall of the rim 14. The slight projection provided by the rib causes the air stream to flow laterally to carry any entrained water over and past the minute crevice between the mating faces of the joint, thus securing freedom from leakage with only reasonably closeness of fit at the joint.

Figure 4:
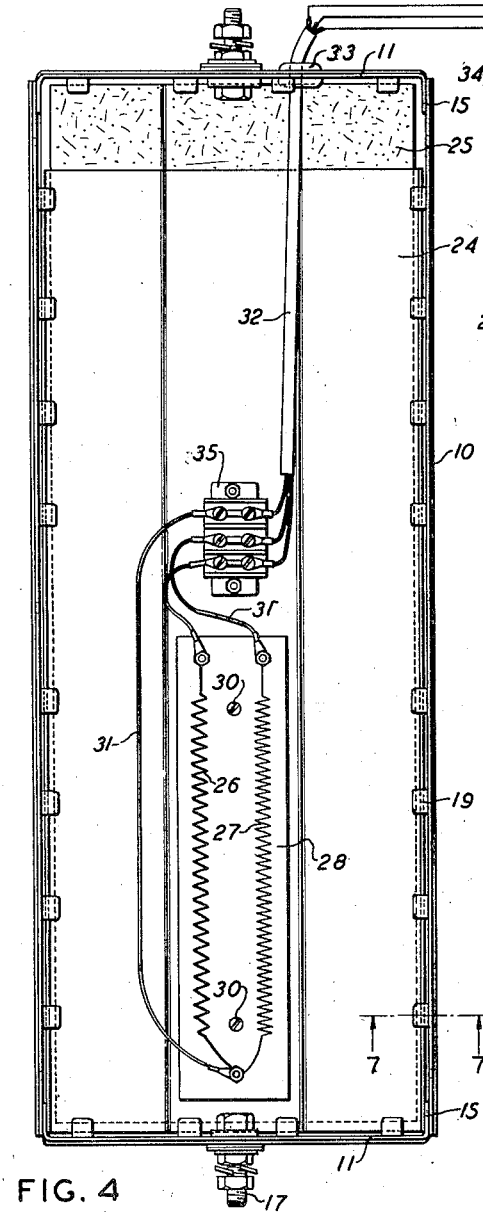
Fig. 4 is an interior elevation of the device with the mirror removed, the interior being viewed as on the line 4—4 of Fig. 2.
Figure 5:
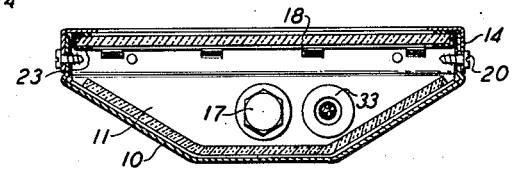
Fig. 5 is a transverse cross-section through the upper end of the device taken as indicated by the line 5—5 of Fig. 1.
Figure 6:
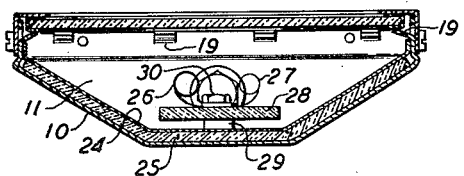
Fig. 6 is a transverse cross-section through the lower end of the device, taken as indicated by the line 6—6 of Fig. 1.

The end plates 11 fit inside the end of the trough member 10 as indicated at 15 in Figs. 3 and 4. The end plates 11 may be welded or brazed to the trough member as preferred, the bonding metal being applied from the inside. Each of the end plates 11 is provided with a projection or rib 16 (Fig. 3) aligned with the previously mentioned side ribs 12, the ribs 16 being of the same height and serving the same purpose. The end plates 11 are further provided with openings through which studs 17 are passed for attachment of the mirror casing to a suitable bracket (not shown) by means of which the casing may be supported and on which it may be swivelled and locked in the required angular position.

The mirror 18 is supported within the casing by tongues 19 which are formed from the sheetmetal of the side and end walls by punch press operation. The punch and die should be so formed that the tongues are directed outwardly at a low angle relative to the mirror as best seen in Fig. 7. These tongues 19 press the mirror against the inner face of the rim with sufficient force to prevent any possibility of chattering. The resilience of the tongues also permits the use of a very thin gasket between the glass and the rim.

The retaining rim 14 is formed from sheet metal to serve as a frame to cover the marginal portions of the mirror face and the four edges of the rim are bent to almost but not quite 90° from the plane of the face of the rim. As the adjacent edges of the rim 14 are not joined, the sides and ends diverge slightly to facilitate the placing of the rim over the mirror but when the sides and ends are drawn down by the insertion of suitably spaced screws 20, a close joint with the trough member 10 and the end plates 11 is produced.

Figure 8:
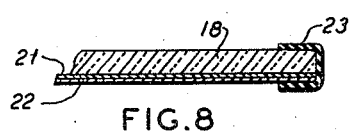
Fig. 8 is a detail illustrating a preferred form of mirror gasket.

The mirror 18, which has the usual silver coating 21 and layer of protecting paint 22, is encircled by a gasket 23, as best seen in Fig. 8. This gasket is preferably of the material known commercially as "Koroprene," a tape coated with an adhesive on the side in contact with the glass and coated on the other side with a mixture of synthetic rubber and powdered cork. This tape protects the edges of the mirror from chipping while its upper surface forms a tight seal against the inner face of the retaining rim.

Inside the trough member is mounted a suitable heat-reflecting element 24 of bright or polished sheet metal, backed by a layer 25 of insulating material such as sheet asbestos. The extended width of this reflector should be not less than that of the trough member 10 to permit it to be sprung into place with its edges beneath the tongues 19.

Preferably the heating means comprises two coils 26 and 27 formed of suitable resistance wire, these coils having two different levels of heat output. The coils are mounted on a slab or panel 28 of stiff asbestos board, which, in turn, is retained on studs 29 by screws 30. It is apparent that the heating element comprising the two coils and the panel on which they are mounted is readily removable. A special advantage of the use of heating elements in coiled form is that such coils withstand shock and vibration without breakage and readily expand and contract without creating excessive stresses.

The use of heating coils extended uniformly over the entire length of the mirror results in overheating the upper end of the mirror and in insufficiently heating the lower end of the mirror. It has been discovered that this differential effect is caused by convection inside the casing, the air heated by the coils rising to the upper end of the receptacle. With such unbalanced heating, the choice is between economical use of the electrical energy with the lower portion of the mirror insufficiently heated, or excessive current flow with the upper portion of the mirror overheated. The invention solves this problem by the arrangement shown in Fig. 4, Fig. 9 and Fig. 12 in which the two heating coils are in the major lower portion only of the casing so that the major lower portion of the mirror is heated primarily by radiant heat and the upper portion is heated primarily by convection and conduction, the result being a certain equalization of heat distribution or at least a reduction to an acceptable minimum of the disparity in temperatures.

The two heating coils 26 and 28 are energized by conductors including wires 31 and by means of a cable 32 that passes through a rubber insulator 33 at the top of the casing. The cable 32 leads to the cab of the truck where the wiring includes a three-position selector switch 34 that has an intermediate "off" position and two "on" positions to permit the two coils 26 and 28 to be energized selectively for the two levels of heat output.

It is desirable, though not strictly essential, to interpose a junction block 35 for connecting the wires 31 to the cable 32, this block being removably attached to the reflector 24. The provision of this junction block reduces the length of unsupported connecting wires and makes it possible to remove and replace the entire heating element including the asbestos panel 28 without disturbing the cable 32. The asbestos panel 28 is preferably coated with material such as aluminum paint to make its surface heat-reflecting.

The second embodiment of the invention shown in Figs. 9 and 10 is largely similar to the first embodiment as indicated by the use of corresponding numerals to indicate corresponding parts. This second embodiment differs from the first in the arrangement of heating coils on the asbestos panel 28 and in the particular arrangement of the circuit for controlling the heating coils.

The panel 28 in Fig. 9 carries a low-output heating coil 36 that is centrally positioned on the panel between an upper terminal 38 and a lower terminal 40. The panel also carries a high-output heating coil generally designated 42 that is of U-shaped configuration. This second heating coil 42 has a vertical portion 44 extending between an upper terminal 45 and a lower terminal 46, a lower horizontal portion 48 extending between the lower terminal 46 and a second lower terminal 50, and a second vertical portion 52 extending upward from the lower terminal 52 to an upper terminal 54. The upper terminal 45 is common to both of the heating coils, the low-output heating coil 36 being connected to this terminal by a short portion 55 of the heating coil wire.

Mounted on the reflector 24 above the asbestos panel 28 are a junction block 56 having three pairs of terminal screws and a thermostat 58, the purpose of the thermostat being to regulate energization of the high-output heat coil 42 in an automatic manner.

The upper terminal 45 that is common to both of the heating coils is connected to the junction block 56 by a wire 60; the lower terminal 40 of the low-output heating coil 36 is connected to the junction block by a wire 62 that is back of the asbestos panel; the upper terminal 54 of the high-output heating coil is connected to one side of the thermostat 58 by a wire 64; and a second side of the thermostat is connected to the junction block 56 by a wire 65.

The junction block 56 is connected, in turn, to three wires 66, 67 and 68 of a cable 70 that extends through the usual rubber insulator 33 at the top of the casing and runs to the cab of the truck. In the cab wire 66 is grounded to the truck as indicated at 72; wire 67 terminates at a switch contact 74; and wire 68 terminates at a switch contact 75. A three-position switch arm 76 is shown at its intermediate "off" position spaced from both of the contacts 74 and 75, the switch arm being movable from this position to the two contacts selectively.

The switch arm 76 is connected to the voltage source on the truck represented by the battery 78, one side of the battery being grounded as shown.

The circuit for energizing the low-output heating coil 36 may be traced as follows: wire 66 from ground to the junction block 56, wire 60 from the junction block to terminal 45, resistance wire 55, low-output heating coil 36, wire 62 to the junction block, wire 67 of the cable to the switch contact 74, and switch arm 76 to the ground battery 78. The circuit for energizing the high-output heating coil 42 may be traced as follows: wire 66 from ground to the junction block 56, wire 60 from the junction block to terminal 45, high-output heating coil 42, wire 64 to the thermostat 58, wire 65 from the thermostat to the junction block, wire 68 of the cable to the switch contact 75, and switch arm 76 to the grounded battery 78.

With a twelve volt source, the output of the heating coil 36 may be, for example, 54 watts and the output of the heating coil 42 may be 72 watts at full current. The thermostat 58 has an adjustment screw 80 with a radial flange 82 and the thermostat is provided with a metal tongue 84 which may be bent into locking engagement with the radial flange 82 to maintain a selected adjustment of the screw 80. Preferably the thermostat is set or adjusted for 180° Fahrenheit and is capable of maintaining the temperature in the environment of the thermostat within approximately 1° of its setting. It is apparent that this second embodiment of the invention is constructed for use in a cold climate.

Considering the mirror as the rear wall of the casing, the bright metal reflector 24 is swept back in cross-sectional configuration. Thus, as best shown in Fig. 10, the reflector 24 has a central longitudinal portion 86 flanked by two adjacent side portions or wings 87, each of which wings extends rearward at an acute angle relative to the plane of the mirror. The two rearwardly inclined reflector wings 87 are on opposite sides of the assembly of heating coils on the asbestos panel 28 so that both reflector wings serve to distribute radiated heat from the heating coils. Each reflector wing 87 intersects the plane of the plurality of heating coils at an acute angle and intercepts and reflects the radiated heat for surprisingly effective distribution over the width of the mirror. Where the path of radiation from a heating coil to a point on a reflector wing 87 is relatively short, the path of reflection from the reflector wing to the mirror is relatively long; and, conversely, where the path of radiation from the same heating coil to a point on a reflector wing 87 is relatively long, the path of radiation from that point on the reflector wing to the mirror is relatively short.

Fig. 10 shows diagrammatically the manner in which heat from the heating coil is reflected by the aluminum paint on the asbestos panel 28, by the polished surfaces of the wings 87 of the reflector, and by the slightly bent flanges 85 on the outer margins of the two wings 87. It is to be noted that the two vertical portions 44 and 52 of the high-output heating coil 42 are close to the corresponding vertical edges of the asbestos panel 28 to favor direct radiation to a maximum area of the two reflector wings 87.

Distribution of the generated heat is important, because on the one hand, too much concentration of heat on a local area of the mirror seriously damages the mirror and, on the other hand, insufficient heat at a local area fails to clear the mirror of moisture, ice or snow to defeat the purpose of the invention.

There is also a troublesome problem in that a relatively great rate of heat generation is required for a cold start in cold weather, for example, when a truck has been standing idle for several hours in bad weather in the middle of winter. Once the mirror is thawed out such a high rate of heat generation is not required and it would be highly undesirable to continue to use current from the electrical system of the truck at this high rate when such heat output is unnecessary. More important, if the rate of heat generation required for thawing out a mirror from a cold start in sub-zero weather is used to keep the mirror clear of moisture in milder weather the temperature of the mirror may be raised to the point of damage. When the weather is so cold, however, that the low-output heating coil 36 is inadequate, the switch arm 76 is placed at the contact 75 to energize the high-output heating coil 42 and the thermostat 58 automatically regulates the current flow through the high-output heating coil to maintain the desired temperature.

The troublesome problems of keeping the bottom end of the mirror adequately heated in cold weather is solved by direct radiation from the heating coil 42. It has been found that the lower horizontal portion 48 of the heating coil is highly advantageous for this purpose.

The reflector 24 extends into the upper region of the casing for remote reflection of the radiated heat but convection is the primary mode of heating the upper end of the casing. In this regard a feature of the invention is the positioning of the thermostat 58 in this upper portion of the casing where overheating tends to occur. Thus the thermostat prevents overheating of the upper end of the casing but at the same time balanced heat distribution is assured by the direct radiant heating action of the heating coils at the lower end of the casing.

The purpose of Fig. 11 is to illustrate the fact that the swept-back configuration of the front wall of the casing and the correspondingly swept-back configuration of the reflector 24 inside the casing may be accomplished by making both the front wall and the reflector arcuate or concave in cross-sectional configuration. Thus in Fig. 11 the trough-shaped longitudinal member 10a and the heat reflector 24a are both of curved cross-sectional configuration. In all other respects the structure shown in Fig. 11 may be the same as the structure of the second embodiment of the invention shown in Figs. 9 and 10.

The third embodiment of the invention shown in Fig. 12 is constructed for service in arctic regions and has special utility for military use. This embodiment of the invention has the same casing construction and the same bright metal heat reflector 24, but has a substantially wider aluminum-coated asbestos panel 28a. Above the panel is the usual junction block 56 and the ususal thermostat 58. The junction block is connected in the usual manner to the three wires 66, 67 and 68 of a cable 70, the wire 66 being grounded, the wire 67 being connected to a switch contact 74, and the wire 68 being connected to a switch contact 75 for cooperation with a switch member 76 as heretofore described.

A single central low-output heating coil 88 extends from an upper terminal 90 to a lower terminal 92. The lower terminal 92 is connected to the terminal block 56 by a wire 94 that runs back of the asbestos panel 28. The upper terminal 90 is connected by a short wire 95 to a second upper terminal 96 and this second upper terminal is connected to the junction block by a wire 97. Thus the low-output heating circuit may be traced as follows: wire 66 of the cable 70 from ground to the junction block, wire 97 and wire 95 to the upper end of the heating coil 88, wire 94 from the heating coil to the junction block 56, wire 67 of the cable 70 to the switch contact 74, and switch arm 76 to the grounded battery 78.

The remaining heating coils on the asbestos panel 28a are connected in parallel to function as a composite high-output heating coil. For this purpose a U-shaped heating coil, generally designated by numeral 98, has a vertical portion 100 extending from an upper terminal 102 to a lower terminal 104, a lower horizontal portion 105 extending from the lower terminal 104 to a second lower terminal 106, and a second vertical portion 108 extending from the lower terminal 106 to an upper terminal 110.

The composite high-output coil also includes a pair of parallel vertical coils 112 and 114 and a second similar pair of vertical coils 115 and 116. The pair of coils 112 and 114 are interconnected at their bottom ends by an integral portion 118 of the resistance wire and at their upper ends are connected respectively to upper terminals 120 and 96. In like manner the pair of coils 115 and 116 are interconnected at their lower ends by an integral portion 124 of the resistance wire and at their upper ends are connected respectively to upper terminals 125 and 126.

The U-shaped coil 98, the pair of coils 112 and 114, and the pair of coils 115 and 116 are all connected in parallel with the cable wire 66 and one side of the thermostat 58.

The parallel circuit through the U-shaped coil 98 may be traced as follows: wire 66 of the cable 70 to the junction block 56, wire 97, wire 128, wire 130, U-shaped coil 98, and wire 132 to the thermostat 58. The second side of the thermostat 58 is connected to the junction block 56 by a wire 134 and is thereby connected to the cable wire 68.

The parallel circuit through the two parallel coils 112 and 114 may be traced as follows: cable wire 66 to the junction block 56, wire 97 from the junction block, coil 114, resistance wire 118, coil 112, wire 135, and wire 132 to one side of the thermostat 58. The parallel circuit through the pair of coils 115 and 116 may be traced as follows: cable wire 66 to the junction block 56, wire 97 from the junction block, wire 128, coil 116, resistance wire 124, coil 115, wire 136, wire 135 and wire 132 to the thermostat.

It is apparent that when the switch arm 76 is in the central "off" position shown in Fig. 12, none of the heating coils is energized. When the switch arm is at contact 74 the single central low-output heating coil 88 is energized. When the switch arm is at the contact 75 the U-shaped heating coil 98 is energized in parallel with the pair of heating coils 112 and 114 and in parallel with the pair of heating coils 115 and 116. All of these parallel circuits are controlled by the thermostat 58 and afford a maximum heat output adequate to cope with the severest arctic weather.

My description in specific detail of selected embodiments of the invention will suggest various changes, substitutions and other departures from my disclosure that properly lie within the spirit and scope of the appended claims.

What is claimed is:

1. In a rear view mirror assembly in which a vertically disposed, elongated, rearwardly facing mirror is arranged as the rear wall of a closed, upright casing for housing a heating means, the combination of: a rearwardly facing bright reflector inside said casing and directed towards the back of said mirror; electric conductor means leading into said casing; an upright insulating panel detachably mounted inside the casing rearwardly of the rear reflecting face of said reflector; and a heating means fixedly mounted on said insulating panel and releasably connected to said conductor means whereby the heating means may be disconnected from the cable and said insulating panel may be detached from the casing for bodily removal of the heating means together with said insulating panel on which it is mounted.

2. In a rear view mirror assembly in which a vertically disposed, elongated, rearwardly facing mirror is arranged as the rear wall of a closed casing for housing a heating means, the combination of: a junction block mounted in said casing, said junction block having a plurality of terminals; an insulating panel in said casing detachably supported in said casing; an electric cable leading into said casing and connected to terminals on said junction block; and a heating means fixedly mounted on said insulating panel, said heating means being releasably connected to terminals on said junction block whereby the heating means may be disconnected from the junction block and said insulating panel may be detached from the casing for bodily removal of the heating means together with said insulating panel on which it is mounted.

3. A combination as set forth in claim 2 which includes a rearwardly facing reflector mounted inside said casing to reflect heat from said heating means to the back of said mirror; and in which both said junction block and said insulating panel are mounted on the rearward reflecting side of said reflector.

4. A combination as set forth in claim 3 in which said insulating panel has a bright, rearwardly facing reflecting surface to reflect heat from said heating means to the back of said mirror.

5. A rear view mirror assembly comprising: an upright closed casing; an upright mirror constituting an upright rear wall of said casing; and two heating means of different heating capacities mounted in said casing and connected to enable separate energization, each of said two heating means being vertically coextensive with a lower substantial portion of said mirror and being below an upper substantial portion of the mirror to heat said lower portion primarily by radiation and to heat said upper portion primarily by convection and conduction.

6. A combination as set forth in claim 5 which includes a thermostat inside said casing to control the energization of one of said heating means.

7. A combination as set forth in claim 6 in which said thermostat is positioned in the upper portion of said casing opposite said upper portion of the mirror.

8. A combination as set forth in claim 5 which includes an upright rearwardly facing bright metal reflector formed with rearwardly swept longitudinal side portions; and in which both said heating means are in upright position generally centralized with respect to the reflector.

9. A rear view mirror assembly comprising; an upright closed casing; an upright mirror constituting an upright rear wall of said casing; heating means in the form of at least one coil of resistance wire mounted in said casing in position vertically coextensive with a lower substantial portion of said mirror and being below an upper substantial portion of the mirror to heat said lower portion primarily by radiation and to heat said upper portion primarily by convection and conduction; and a rearwardly facing bright metal reflector inside said casing forward of said heating means to reflect the heat radiated from the heating means back to said mirror.

10. A combination as set forth in claim 9 in which said reflector extends upward into the region of said upper portion of the mirror for remote reflection of heat radiation to said upper portion of the mirror.

11. A combination as set forth in claim 9 in which said reflector is of swept-back cross-sectional configuration, the two longitudinal side portions of the reflector extending generally rearward at an acute angle relative to said mirror.

12. A combination as set forth in claim 9 in which said heating means includes a U-shaped coil with the bottom of the U adjacent the bottom of said mirror.

13. A combination as set forth in claim 9 in which said heating means comprises a plurality of coils in a plane substantially parallel with said mirror; and which includes reflector means providing reflector surfaces on each side of the heating means, said reflector surfaces being swept back to said plane at acute angles and being positioned to reflect laterally directed heat from the heating means to said mirror.

14. A rear view mirror assembly for an automotive vehicle comprising: an upright closed casing; a rearwardly facing upright mirror constituting an upright rear wall of said casing; a rearwardly facing, bright reflector inside said casing and facing towards the back of said mirror, said reflector having rearwardly swept longitudinal surfaces on each side of a central longitudinal region of the interior of the casing; an upright heating means in said central longitudinal region of the casing, said heating means lying in a plane that is forward from said mirror and intersects both of said rearwardly swept reflector surfaces.

15. A combination as set forth in claim 14 in which said heating means includes a U-shaped heating coil with the bottom of the U adjacent the bottom of the mirror.

16. A combination as set forth in claim 14 in which said reflector is of curved transverse cross-sectional configuration.

17. A combination as set forth in claim 14 in which the front wall of said casing has rearwardly swept longitudinal side portions corresponding generally to the rearwardly swept side portions of said reflector.

References Cited in the file of this patent

UNITED STATES PATENTS

| | | |
|---|---|---|
| 1,925,423 | Warhus et al. | Sept. 5, 1933 |
| 1,933,173 | Hunt | Oct. 31, 1933 |
| 2,103,384 | Somohano | Dec. 28, 1937 |
| 2,585,273 | Prutzman | Feb. 12, 1952 |
| 2,588,825 | Goodman et al. | Mar. 11, 1952 |
| 2,694,132 | Kerr | Nov. 9, 1954 |
| 2,722,160 | Prutzman | Nov. 1, 1955 |